United States Patent [19]
Orlick et al.

[11] Patent Number: 4,908,974
[45] Date of Patent: Mar. 20, 1990

[54] LINE RETRIEVING APPARATUS

[75] Inventors: Jonathan B. Orlick, 4316 Hulen Cir. E., Fort Worth, Tex. 76133; William H. Howard, Irvine, Calif.

[73] Assignee: Jonathan B. Orlick, Fort Worth, Tex.

[21] Appl. No.: 378,402

[22] Filed: Jul. 11, 1989

[51] Int. Cl.$^4$ ............................................. A01K 97/00
[52] U.S. Cl. .................................................... 43/17.2
[58] Field of Search ......................................... 43/17.2

[56] References Cited

U.S. PATENT DOCUMENTS

| | | |
|---|---|---|
| 520,052 | 5/1894 | Hirschmann . |
| 720,136 | 2/1903 | Halliran ............................... 43/17.2 |
| 1,215,073 | 3/1917 | Stevens . |
| 1,851,370 | 3/1932 | Munger ................................ 43/17.2 |
| 2,171,050 | 8/1939 | Slawson ............................... 43/17.2 |
| 2,175,135 | 10/1939 | Sorenson et al. . |
| 2,526,031 | 10/1950 | Kocarek ............................... 43/17.2 |
| 2,608,785 | 9/1952 | Hall ..................................... 43/17.2 |
| 2,887,814 | 5/1959 | Chambers ............................ 43/17.2 |
| 2,915,845 | 12/1959 | Hughes ................................ 43/17.2 |
| 2,968,112 | 1/1961 | McClure .............................. 43/17.2 |
| 2,979,847 | 4/1961 | McKinney ........................... 43/17.2 |
| 3,183,619 | 5/1965 | Walden ................................ 43/17.2 |
| 3,224,132 | 12/1965 | Frantz .................................. 43/17.2 |
| 3,352,049 | 11/1967 | Agostini .............................. 43/17.2 |
| 3,735,520 | 5/1973 | Jarrett .................................. 43/17.2 |
| 3,802,110 | 4/1974 | Guillemain .......................... 43/17.2 |
| 4,301,610 | 11/1981 | Brown ................................. 43/17.2 |
| 4,598,493 | 7/1986 | Obrien et al. ....................... 43/17.2 |

Primary Examiner—M. Jordan
Attorney, Agent, or Firm—Jonathan B. Orlick

[57] ABSTRACT

An apparatus and method for retrieving lines, ropes, wires, optical fibres and the like from otherwise inaccessable locations, without the need for separate control lines, dissolving tables and the like. The apparatus comprises a line guide assembly, line clamping assembly, a line cutting assembly and a triggering mechanism for the activation of the aforementioned assemblies. The triggering mechanism is activated by the application of force to the line to be retrieved.

38 Claims, 9 Drawing Sheets

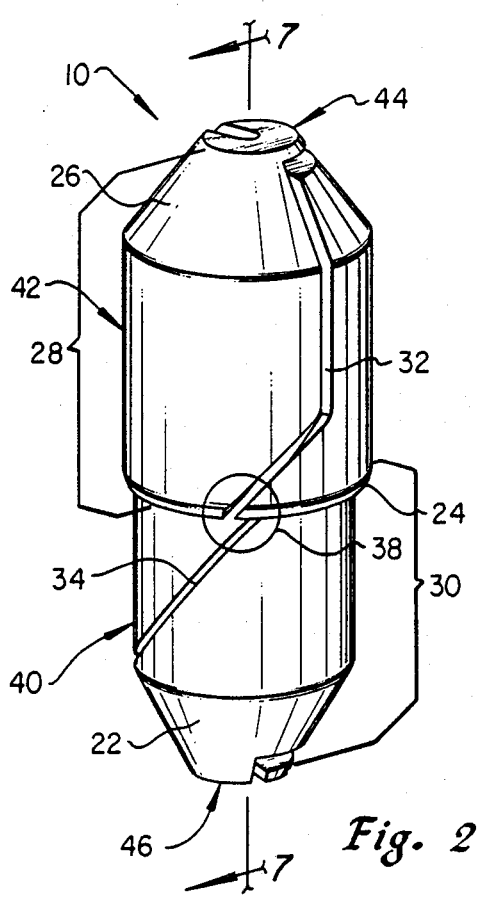
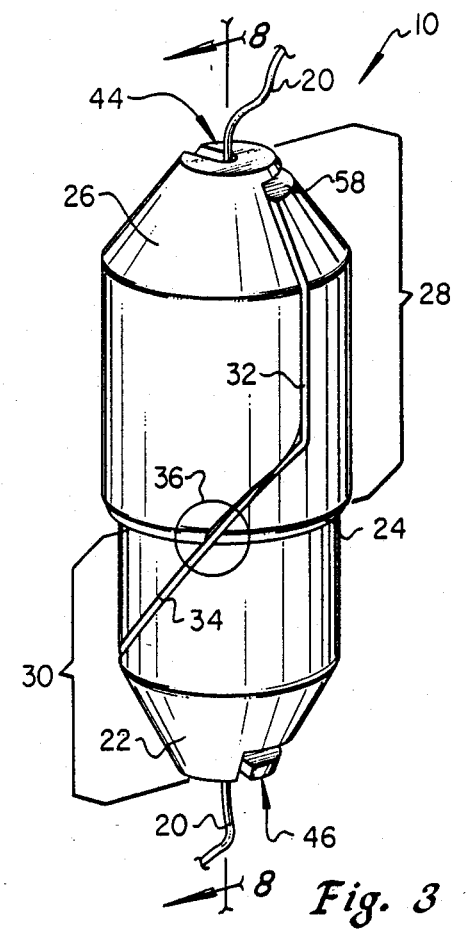
Fig. 2
Fig. 3
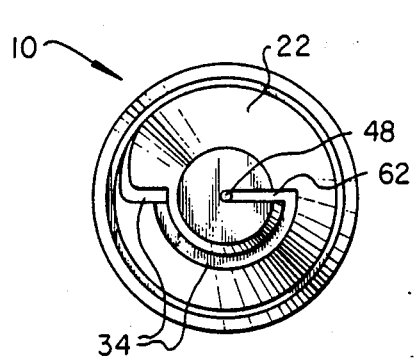
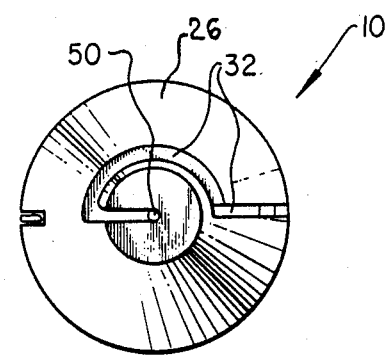
Fig. 4
Fig. 5

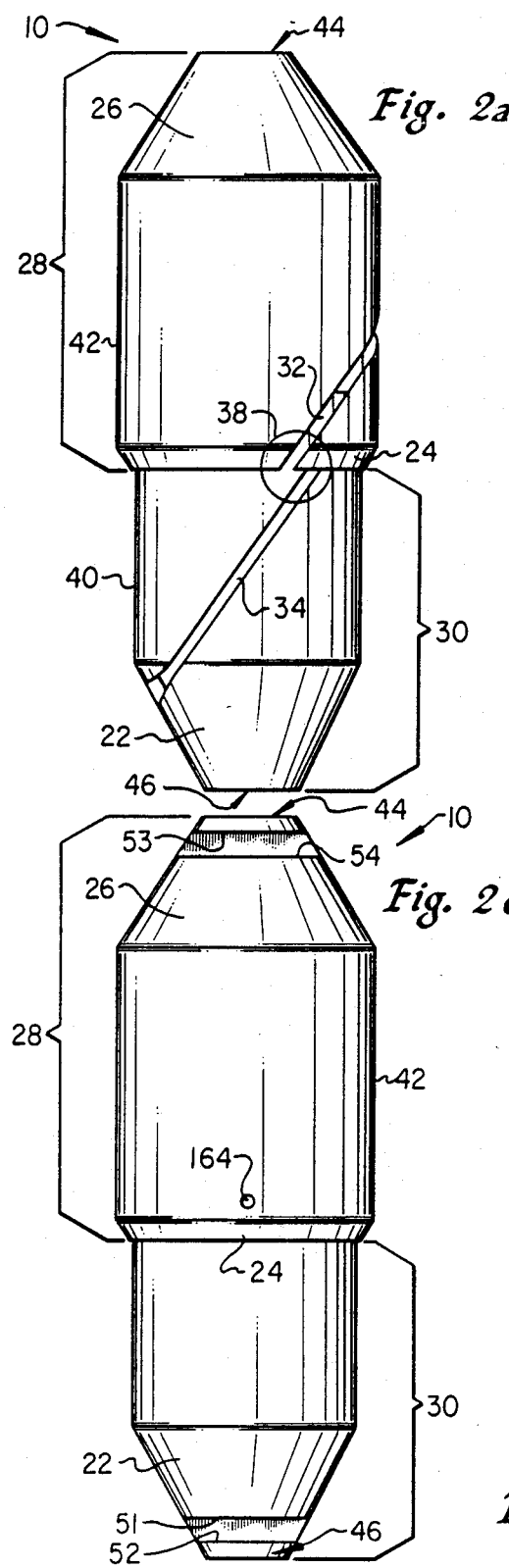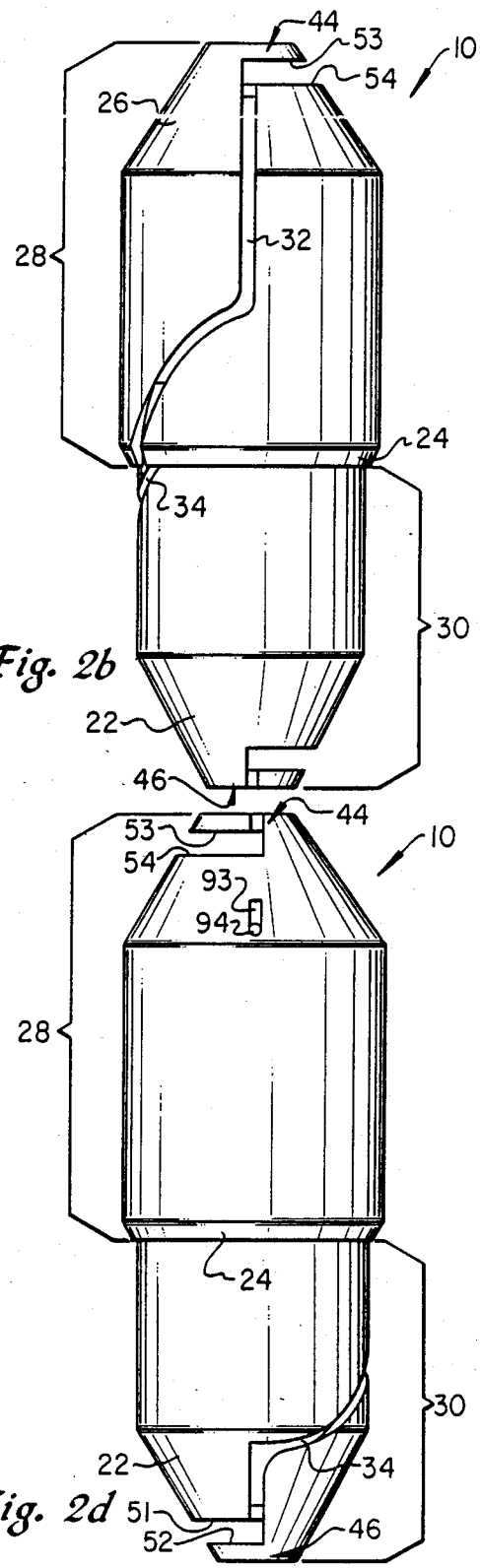

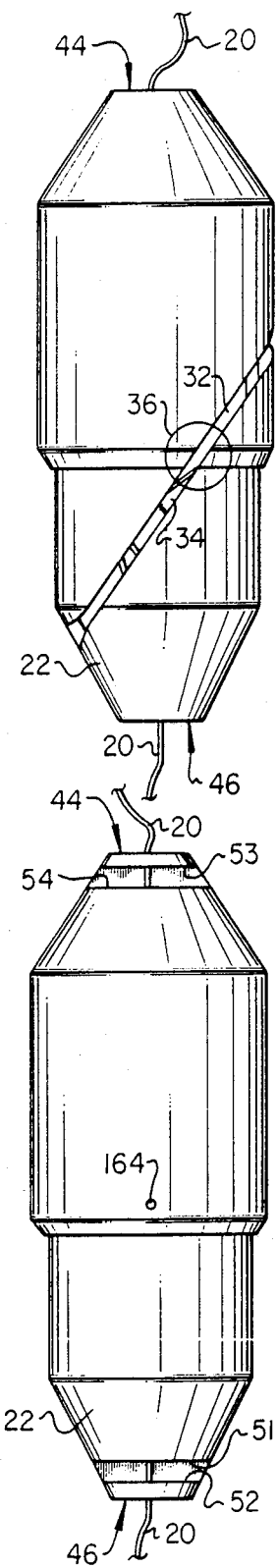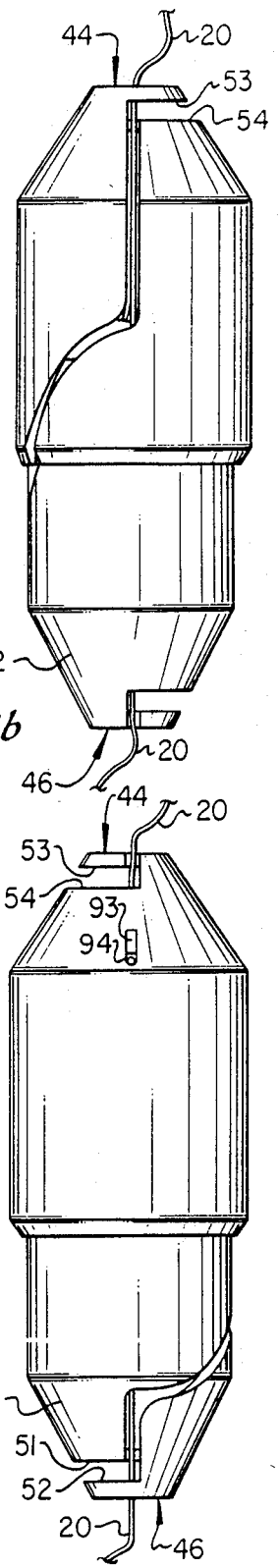
Fig. 3a
Fig. 3b
Fig. 3c
Fig. 3d

LINE RETRIEVING APPARATUS

BACKGROUND OF THE INVENTION

1. Field of the Invention

The present invention relates to an apparatus and method for releasing a fishing line and for retrieving a major portion thereof, when the line's terminal end is caught, snagged or is otherwise inaccessible to a person who is fishing.. The novel features and principles of the present invention while particularly applicable to the fishing art may be extended to other fields of art having a need for the retrieval of similarly situated cables, wires, ropes, optical fibers and the like.

2. Description of the Related Art

Eons ago, when some coastal caveman figured that there were more fish on or near the bottom than there were at the surface, he tied a rock to his primitive line and began to fish the depths of the oceans, lakes and other such bodies of water.

It is likely that this caveman had several size rocks and lines handy, in case the line and rock became lost in a struggle with a fish or to the bottom as a result of a hopeless snag. Indeed this later scenario is likely, in view of several ingeniously shaped stones, fashioned for fishing weights, that have been found among artifacts in waters proximate to ancient Inca and pre-Inca civilizations in South America. As civilization progressed through the passage of time, fishing weights and tackle were improved, but the basic problems associated with retrieving a line which has been snagged beneath a body of water still persist today.

Accordingly, it is a general proposition well recognized in the fishing art that most bodies of fishable waters are infested with ensnarling vegetation, debris, coral shipwrecks and other obstructions upon which hooks, lures, plugs and other tackle may, from time to time become embedded or snagged during the fishing process.

Traditionally accepted methods for releasing snagged fishing tackle include: cutting the line at the end nearest to the angler and taking one's losses; or the futile expenditure of time, patience and effort in an attempt to free the snagged lure and associated tackle. While this latter course of action is somewhat frustrating, it is the alternative which a great majority of anglers elect to take although it bears certain disadvantages, including the risk of loss or damage to a major portion of the snagged line.

More specifically, attempts at retrieving a snagged line often involve the relocation of the boat or angler to a location behind the point of ensnarement. Once so positioned, the angler exerts tension on the line by pulling and jerking the line. If the angler is lucky, the line and tackle will come free, otherwise the line breaks or remains snagged. More often than not, when the line cuts or breaks or comes free, it does so abruptly, which can be dangerous. In those instances where the line does come free it has often been twisted and stretched, thereby, reducing its strength and utility for further fishing.

A further disadvantage of pulling and jerking the line is that the angler has no control of where the line will break, if it indeed breaks at all. If the line breaks near the angler, then the angler would have been better off to have cut the line, either way, the angler looses out. Even more importantly, the environment ultimately suffers as a result of the lost line. More particularly, fishing line, which is normally composed of nylon monofilament degrades quite slowly and the tangle of the line stripped off a reel clutters fishing grounds for years. This lost line has the disadvantage of creating an eyesore and a nuisance which can foul up a fishing area and provide a lethal trap for birds, fish and other wildlife.

Many devices have heretofore, been devised in order to retrieve line lures, hooks, plugs, and associated tackle. These devices have been comprised of various geometric configurations, sizes and clamping means to fasten to the fishing line. Many, if not all of these devices have met with only limited degrees of success. By and large, they have been impractical or unsatisfactory because their weight, size and/or complexity made them to cumbersome to store and handle in an ordinary tackle box. Additionally, many of the related art devices were difficult and time consuming to apply and release as well as being generally inefficient for their intended purpose.

Exposed cutting surfaces on some related art devices further complicated use by compromising user safety for functional design inadequacy. More often than not anglers, not only experienced the unnecessary loss of valuable fishing line and tackle but also incurred loss of the lure retriever as well. On some occasions the cost of a lost retrieving device was far in excess of the lost lure and associated tackle.

Experience indicated that the majority of these related art devices were often incapable of rendering the desired performance because of inadequate design, complexity of component parts, operator error or simple ineffectiveness. Oftentimes, these devices were not free to travel in tight spaces, lacked mobility, and became entangled upon their control lines, utilized unreliable dissolving tabltts to control their mechanisms, and/or required a multiplicity of hands to be applied, operated and released.

To further complicate matters, many related art devices were overly aggressive in their goals, attempting to recover both the line and the associated tackle connected thereto. While these goals are admirable it is not yet believed that this can be done reliably under constantly changing and therefore unknown conditions.

More exactly, the major failing of these all encompassing retrieving devices is that they assume a particular condition of ensnarement and generally are specifically designed for retrieval under such a given situation. In practice, however, an angler is generally unaware of exactly what circumstances have caused the line and associated tackle to become snagged. Accordingly, an angler would not know which prior art device to use in a given situation. Guess work led to frustration and losses of both the line and retrievers.

From the foregoing, the need should be appreciated for a safe to use, environmentally beneficial, small, reusable, inexpensive, reliable and easy to handle line saving device that operates effectively under myriad situations. Accordingly, a fuller understanding of the invention may be obtained by referring to the SUMMARY OF THE INVENTION, and the DETAILED DESCRIPTION OF THE PREFERRED EMBODIMENT, in addition to the scope of the invention as defined by the claims taken in conjunction with the accompanying drawings.

SUMMARY OF THE INVENTION

This invention resides in certain novel features of construction, combination and arrangement of elements and portions as will hereinafter be described with specificity in the detailed description of the preferred embodiments, as particularly pointed out in the appended claims, and illustrated in the accompanying drawings.

For the purpose of summarizing the invention, the invention comprises a line retrieving apparatus and method. In its preferred form the apparatus includes a hollow, streamlined, bifrucated body member, a line guide means, a line clamping means, a line cutting means and a triggering means. The line clamping means, line cutting means and triggering means are supported and disposed inside of the aforementioned body member. The line guide means is integrally formed as part of the bifrucated body member.

In actual use, when an angler encounters a snag, he or she positions themself as near as possible to a point over the snag. Once so positioned, slack is taken up in the snagged line and the triggering means disposed with the body member is armed by the inward compression of both ends of the bifrucated body member. Once armed, the body member is then placed on the snagged line, via the line guide means.

The line guide means functions to support a snagged line in a manner so as to permit vertical movement of the body member along a snagged liee to the vicinity of a hook, swivel, weight, or the like which is snagged or otherwise unretrievable from a body of water. Not only does the line guide means permit the aforementioned vertical movement but it also automatically positions the snagged line in a desired position, inside the body member, with respect to the line clamping, line cutting and triggering means.

Once the apparatus has been so placed on the line, it is released and allowed to descend via gravity to a location proximate to the ensnarement. The angler then moderately tugs the snagged line, thereby, initiating the triggering means. Once triggered, the line is clamped by the line clamping means and almost instanaaneously the line comes into contact with the line cutting means. A subsequent, second tug or a continued pull on the snagged line cuts the line, freeing it from its ensnarement allowing the angler to retrieve a major portion of the snagged line along with the device, both for subsequent reuse.

It is an object of this invention to provide an apparatus which overcomes the aforementioned inadequacies of the related art methods and devices while providing a significant contribution to the advancement of the art.

Another object of this invention is to provide a device and method for the purposes of retrieving the line portion only of a fishing line which has become entangled with submerged rocks, coral, roots or the like at a point distant from the angler, hereinafter referred to as "Expected Purposes".

It is yet another object of the instant invention to provide an inexpensive device which has no objetionable characteristics, but which has the essential features of compactness.

It is an advantage of the instant invention to provide a device simple in construction and operation which is efficient, lightweight, reusable and durable for the purpose of retrieving the major portion of an ensnarled line in a quick, easy and rliable manner.

It is an object of the subject invention is to provide a reliable device and method for severing a line proximate to the point of ensnarement so that the device itself may be retrieved along with a major portion of line, for inspection repair and subsequent reuse.

Still another object of the present invention is to provide a device having a dependable service life which can be utilized in frequent applications of the same device without necessitating the purchase of new devices except in cases of extended use, abuse or unavoidable accident.

It is an advantage of this invention to provide a device for the "Expected Purposes" which does not require special tools, procedures, mechanical skills, aptitudes or abilities to apply and practice.

It is a feature of the instant apparatus to provide a hydro-dynamically shaped device for the "Expected Purposes" which enhances its descent and retrieval through varying under water currents and debris.

It is also a feature of the present invention to provide a device for the "Expected Purposes" that has a mass great enough to sink but that will not exert an undue stress on terminal tackle and the like.

It is an object of this invention to provide an apparatus and method that accomplishes the "Expected Purposes" which utilizes the snagged line itself for the control and retrieval of the device, thereby eliminating the need for separate control lines, dissolving tablets and the like.

Yet another object of this invention is to provide a device for the "Expected Purposes" which reduces the possibility of loss by automaticall preventing loading onto a snagged line unless such invention is properly armed.

Yet, another advantage of this invention is to provide a device for the "Expected Purposes" which is safe to use by providing a totally enclosed line cutting mechanism.

A further feature of the invention is to provide a device for the "Expected Purposes" that avoids excess pulling and stretching of ensnarled lines, thereby not damaging the line and accordingly, avoiding abrupt breakage and corresponding accidents.

BRIEF DESCRIPTION OF THE DRAWINGS

Further objects, features and advantages of the present invention will become apparent as the following DESCRIPTION OF THE PREFERRED EMBODIMENT proceeds taken inconjunction with the accompanying drawings in which:

FIG. 2 is a perspective view of a preferred embodiment of the invention illustrated in an unarmed/uncompressed condition.

FIG. 2a is a front elevational view of the invention illustrated in FIG. 2.

FIG. 2b is a right elevational view of the invention illustrated in FIG. 2.

FIG. 2c is a rear elevational view of the invention as illustrated in FIG. 2.

FIG. 2d is a left side elevational view of the invention as illustrated in FIG. 2.

FIG. 3 is a perspective view of a preferred embodiment of the invention illustrated in an armed/compressed position. This figure additionally shows a portion of a line inserted within the retrieving device.

FIG. 3a is a front elevational view of the invention illustrated in FIG. 3.

FIG. 3b is a right side elevational view of the invention illustated in FIG. 3.

FIG. 3c is a rear elevational view of the invention illustraed in FIG. 3.

FIG. 3d i a left side elevational view of the invention illustrated in FIG. 3.

FIG. 4 is a bottom plan view of the invention as illustrated in FIGS. 2 and 3. (Note: line insertion not illustrated)

FIG. 5 is a top plan view of the invention as illustrated in FIGS. 2 and 3. (Note: line insertion not illustrated)

Similar reference characters and numerals refer to similar parts throughout the several views of the drawings.

Figure 1:
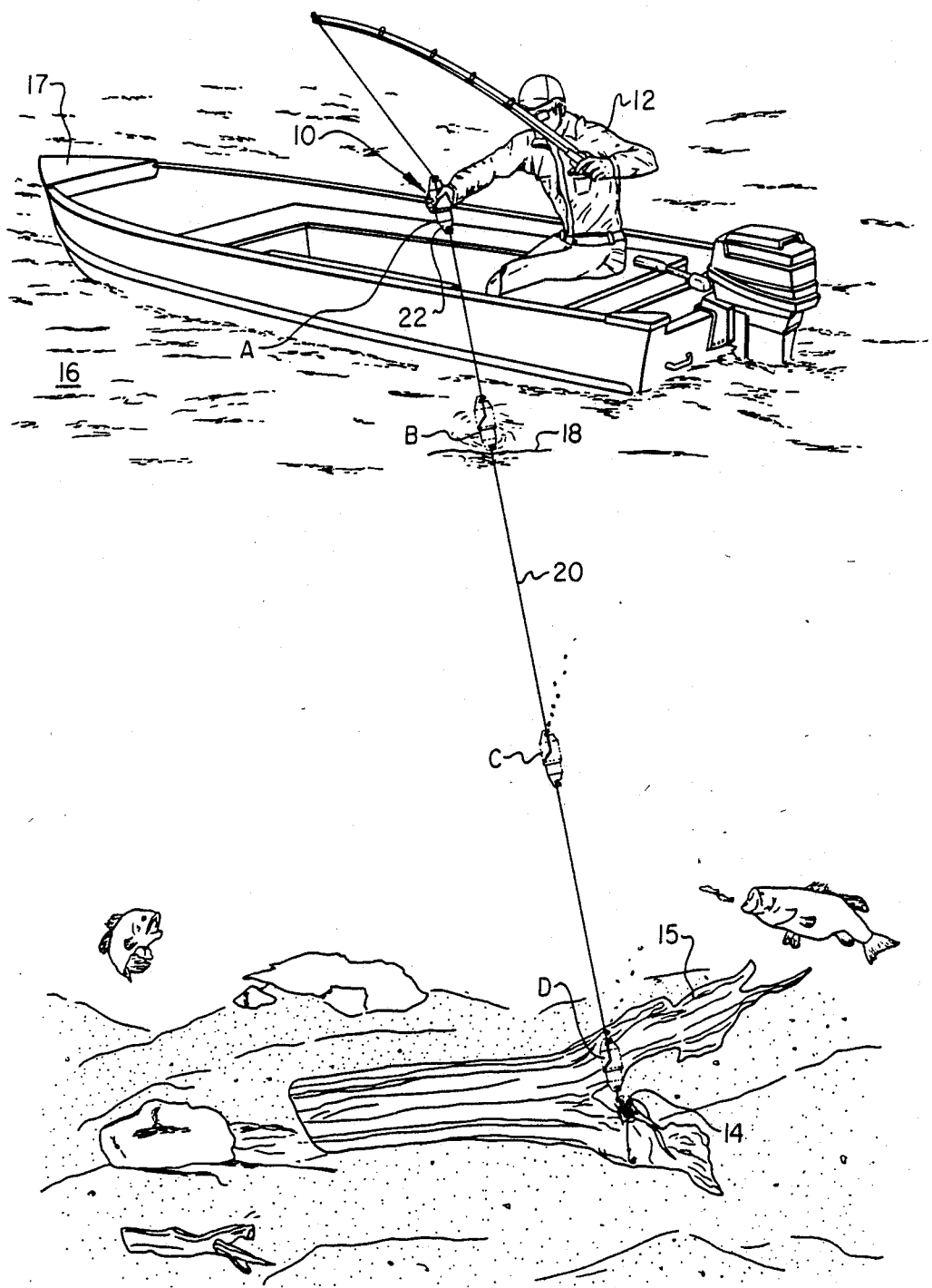
FIG. 1 is a perspectvve view of a preferred embodiment of the retrieving device being lowered along a snagged line toward the point of ensnarement.

DRAWING REFERENCE NUMERALS:

10 Line retrieving apparatus
12 angler
14 point of fishing line 20 ensnarement
15 underwater debris
16 body of water
17 boat
18 surface of 16
20 fishing line
22 contoured leading edge of 30
24 contoured middle surface of 28
26 contoured trailing edge of 28
28 upper assembly of 10
30 lower assembly of 10
32 line channel of 28
34 line channel of 30
36 reference point illustrating alignment of channels 32 and 34
38 reference point illustrating non-alignment of channels 32 and 34
40 lower casing of 30
42 upper casing of 28
44 line guide of 28
46 line guide of 30
48 concentrically aligned guide hole of 46
50 concentrically aligned guide hole of 44
51 semicircular member of 46
52 semicircular member of 46
53 semicircular member of 44
54 semicircular member of 44
56 cutout of 44
57 cutout of 44
58 cutout of 46
59 cutout of 46
60 severed terminal portion of 20
62 trigger pivot arm of 80
64 shank portion of 80
66 top end of 64
68 inside surface of 42
70 longitudal axis of 10
72 trigger assembly
74 cam assembly
76 line cutting assembly
78 trigger spring of 72
80 trigger lever of 72
81 lower end portion of 64
82 left cam of 74
84 right cam of 74
86 line positioning arm
88 reference point to windings of trigger spring 78
90 foot portion of 80
92 end portion of 78
93 trigger spring retention slot of 42
94 casing grip portion of 78
98 V groove of 80
100 longitudinal axis of 62
101 vertical axis of 80
102 blade
104 cutting surface of 102
106 longitudinal axis of 64
108 trigger stop 108
110 left cam positioning rib of 40
112 right cam positioning rib of 40
114 leading edge of 40
116 cam spring of 74
118 reference numeral illustrating cutting of line 20
120 arrow indicating direction of force on line 20
122 first body rib of 42
124 second body rib of 42
126 cam retaining rings
128 retention ring of 86
130 cam ledge 130 of 42
132 cam pin of 84
134 cam pin of 82
136 cam arm of 8
138 cam arm of 84
140 cam post of 84
142 cam post of 82

144 mounting plate of 86
146 hole of 144
148 left cam pin fitting hole of 82
152 support rib for 102
154 support rib for 102
156 protrusion of 152
158 protrusion of 154
160 compression spring of 28
162 spring cavity of 42
164 roll pin hole of 42
166 roll pin hole of 130
168 roll pin cutout of 40
170 roll pin
172 weight
174 cam washers
176 support ribs of 130
178 mounting holes of 82
179 mounting holes of 82
180 ramped surface for 80
182 gritty cam surface
184 grooved errated cam surface
190 heads of fastening screws for 116
192 bevelled surface of 90

DESCRIPTION OF THE PREFERRED EMBODIMENT

The use of a preferred embodiment of the invention will be explored initially as a backdrop for an improved understanding of the invention which follows. Accordingly, referring to the drawings and particularly to FIG. 1, there is shown a perspective view of the invention 10 being utilized by an angler 12.

The invention 10 is illustrated in four representative physical positions A, B, C and D with respect to the angler 12 and with respect to the poit of ensnarement 14 of the fishing line 20. Positions B, C and D of the device 10 are illustrated in phantom to depict the movement of the device 10 through the water 16.

The scene portrayed by FIG. 1 is an all to common one where the angler 12 has snagged a line 20 on some type of underwater debris 55. When line 20 has become snagged, angler 12 relocates the boat 17 to a point as close as possible over the point of ensnarement 14. Next, the angler arms the invention 10 by compressing the invention 10 inwaddly from each of its ends. A complete discussion of the mechanics of arming and placing the dvice 10 onto a fishing line will be eplored infra.

Once the invention 10 has been armed, the angler 12 then takes up any slack in the snagged line 20 and places invention 10 onto the snagged line 20. A complete discussion of such placement will also follow infra. Position A illustrates angler 12 placing invention 10 onto fishing line 20.

Once the invention 10 has been placed on the fishing line 20, the angler 12 releases the invention 10. The invention 10 then descends, via the force of gravity down fishing line 20, through the water 16 to the point of ensnarement 14.

As previously mentioned, the travel of the device 10 down fishing line 20 is illustrated, in FIG. 1, at four representative positions A, B, C and D. Position A represents the point of release of the device 10 by the angler 12. The angler 12 is shown using the invention 10 from a boat 17. It is to be appreciated that the device 10 may be used from any number of locations including but not limited to bridges, piers, cliffs and the like, wtthout affecting the operation and function of the invention 10.

The point of contact of the device 10 with the surface 18 of the water 16 is illustrated at position B of FIG. 1. It is at this point in which the device 10 penetrates the surface 18 of the water 16 along its travel to the ensnarement 14.

Referring now to FIGS. 1-4, it can be appreciated that the contoured shape of the leading edge 22 of the device 10 allows for the ease of entry into the water 16 and especially functions to reduce the force of impact of device 10 with the surface 18 of the water 16. This cushioning effect is especially important when the device 10 is released at great distances above the surface 18 of the water 16, such as from a bridge or fishing pier as previously mentioned. It is noted that contoured surfaces 24 and 26 (see FIGS. 2-5) are also hydrodynamically shaped to further enhance the movement of device 10 down through the water 16 to the point of ensnarement 14 and backup through the water 16 to the surface 18.

Position C, in FIG. 1, depicts the device 10 as being somewhere halfway between the surface 18 of the water 16 an the ensnarement 14. It is at this position C where underwater currents and debris are typically but not always present. The hydrodynamic shape of the device 10 not only functions to reduce the impact of the device 10 with surface 18 but also is helpful in penetrating semi-boyant, subsurface floating seaweed layers, debris and the like. More particularly the shape of device 10 reduces the likelihood of snags or hangpps. Furthermore, the hydrodynamically shaped device 10 ameliorates the effect of underwater currents on th decent and ascent of the device 10. It is also apparent from FIG. 1, position C, that trapped air within the device 10 escapes upon the device 10's descent, thereby reducing the buoyancy of device 10, which further facilitates the descent of device 10.

After a period of time, as judged by the experience of the angler, the device 10 will travel to and reach the point of ensnarement 14. The length of time required for the completion of the device 10's travel is dependent upon the depth of the ensnarement 14 with respect to the surface 18 of the body of water 16 and upon other environmental variables such as water current strength. It is noted, however, that the time for decent of the device 10 to the point of ensnarement is generally no greater than two (2) minutes.

After the device 10 has traveled to position D, as shown in FIG. 1, the angler 12 lightly tugs and maintains tension on the snagged fishing line 20. This force or tug is typically no greater than five (5) lbs. The angler's 12 tugging on the snagged line 20 functions to trigger or otherwise active device 10. Once triggered, the device 10, aided by the tension forces placed on the line 20, clamps and severs the fishing line 20.

Upon completion of the aforementioned clamping and cutting of line 20 the angler 12 will experience a noticeable relaxation in the tension of the snagged fishing line 20. At this juncture, the major portion of the fishing line 20 along with the device 10 may be reeled in or otherwise retrieved. Once the major portion of the fishing line 20 has been recovered along with device 10, the device 10 is removed from the terminal end of the severed fishing line 20, so that the device 10 may be stored and used again when needed.

It is to be appreciated that the use of the invention 10 just described is just one example of an application of the invention 10. Other embodiments, using the principles and teachings of the invention 10, may be extended to several applications including oil drilling, exploration and to the retrieval of ship anchors and the like. Indeed, the principles and teachings of the instant invention 10, may be employed for the retrieval of cables, wires, ropes, bouyline, diving markers, optical fibers and other similar materials. The teachings of this invention may also be extended to use in outerppace or to other environments where an absence of gravity exists.

Now that an exemplary use of the invention 10 has been described the mechanism, structure and mechanics of operation of a preferred embodiment of the invention 10 will be explored. FIGS. 2, 2-a2d illustrate various views of the invention 10 in an unarmed/uncompressed condition. The invention 10 as illustrated in FIG. 2 comprises an upper assembly 28 and a lower assembly 30. The lower assembly 30 has an outside diameter slightly smaller than the inside diameter of the upper assembly 28. This structure, allows the lower assembly 30 to loosely fit within the upper assembly 28, thereby forming a hollow body member which houses the mechanisss of the invention 10.

The preferred embodiment of invention 10 is designed to accommodate a fishing line only when the device 10 is placed into an armed/compressed position as those in FIG. 3 and FIGS. 3a-3d. More particularly, line channels 32 and 34 come into alignment with each other when the lower assembly 30 slides inwardly into the upper assembly 28. This alignment is specifically shown by reference numeral 36 in FIGS. 3 and 3a.

When the invention 10 is an unarmed/uncompressed condition as best shown in FIGS. 2 and 2a, channels 32 and 34 are out of alignment. When channels 32 and 34 are out of alignment the device 10 cannot be loaded onto a line. Reference numeral 38 in FIGS. 2 and 2a specifically illustrates this aforementioned non-alignment of the line channels 32 and 34. The alignment/non-alignment feature ensures that the device 10 is armed prior to its use, thereby avoiding accidental loss due to misuse of device 10 by the operator.

The line channels 32 and 34 are constructed and formed as an integral part of the invention 10 casings 40 and 42. The positioning of the line channels 32 and 34 insures that during the placement of the device 10 onto any given snagged line 20 that line 20 is positioned correctly with respect to the invention 10's internal mechanisms, such mechanisms to be described in detail infra.

The configuration of the line channels 32 and 34 may be more fully appreciated by reference to FIG. 2 and FIGS. 2a-2d. These figures illustrate line channels 32 and 34 as they extend in a circulate fashion between line guide members 44 and 46 respectively. The rationale and functionality for the positioning of channels 32 and 34 will become apparent, infra, as the detailed description focuses on the internal mechanisms of the device 10.

Figure 6:
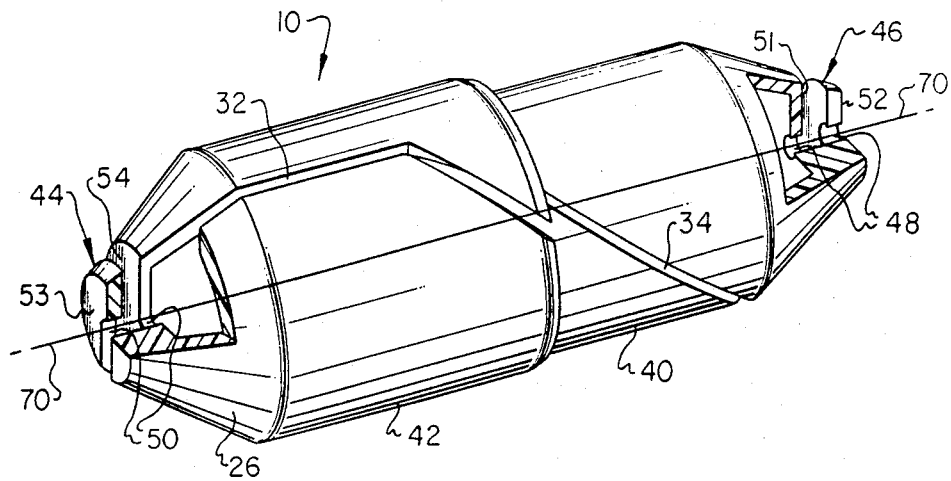
FIG. 6 is a perspective, partially sectioned view of the invention illustrating a line guide means of the preferred embodiment of the invention.

FIG. 6 is a perspective, partially sectioned view of the invention 10, illustrating in particular line guides 44 and 46. These line guides are integrally formed as a part of the upper and lower portions of casings 42 and 40 respectively. This one piece, integral construction eliminates additional parts and reduces manufacturing cost and reduces the possibility of snags or hang ups which often result when separately attached line guide mechanisms are used.

Line guides 44 and 46 operate in conjunction with each other to slideably support and maintain the invention 10 on a line. This support is accomplished by the concentric alignment of guide holes 48 and 50 along the longitudinal axis 70 of invention 10. More specifically, guide holes 48 and 50 are formed as a result of the spacing and construction of semi-circular members 53, 54 and 51, 52 respectively.

Figure 6A:
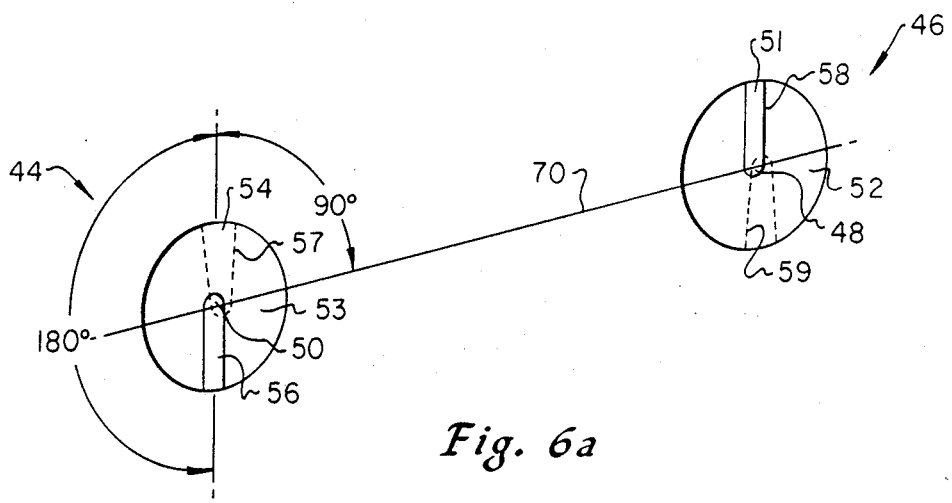
FIG. 6a is a diagramatic functional illustration of line guides 44 and 46 as shown in FIG. 6.

This spacing and construction of line guides 44 and 46 is best appreciated by reference to FIG. 6 in conjunction with FIG. 6a. FIG. 6a diagramatically illustrates the functional structure of line guides 44 and 46 respectfully. As can be seen in these figures, guide holes 48 and 50 are formed by the spacial intersection of cut outs 56, 57 an 58, 59 in semiccircular members 53, 54 and 51, 52 respectively.

More particularly, members 51 and 52, as are members 53 and 54, are spaced apart from and parallel to each other (this spacing is clearly shown in FIG. 6). The spacing between members 51 and 52 and between 53 and 54, respectively, is preferably 0.16 inches, or at least as far apart as the diameter of the thickest line contemplated to be recovered with any particular embodiment of the invention 10. In other words, the distance between members 51 and 52 and between 53 and 54 respectfully, must at least wide enough to accommodate loading of the device 10 on to a snagged line to be retrieved. Member 54 is spaced parallel and beneath member 53. Member 51 is similarly situated beneath member 52.

Upon further inspection of FIGS. 6 and 6a it can be seen that semi-circular member 53 is slotted by cutout 56. Cutout 56 extends from the periphery of semi-circular member 53 inward to the longitudinal axis 70. Similarly, cutout 57 (shown in phantom lines) extends inwardly from the periphery of semi-circular member 54 to the longitudinal axis 70. The intersection of the cutouts 56 and 57 in the spacially separated semi-circular members 53 and 54 form guide hole 50. Cutouts 56 and 57 are preferably oriented 180 degrees with respect to each other, and 90 degrees with respect to the longitudinal axis 70.

The configuration and formation of guide hole 48 of line guide 46 is likewise realized by cutouts 58 and 59. Of particular import is the reversed orientation of cutouts 56 and 58, and of cutouts 54 and 59. This orientation is preferred for enhanced stabilization of the device 10 onto the line 20.

Figure 7:
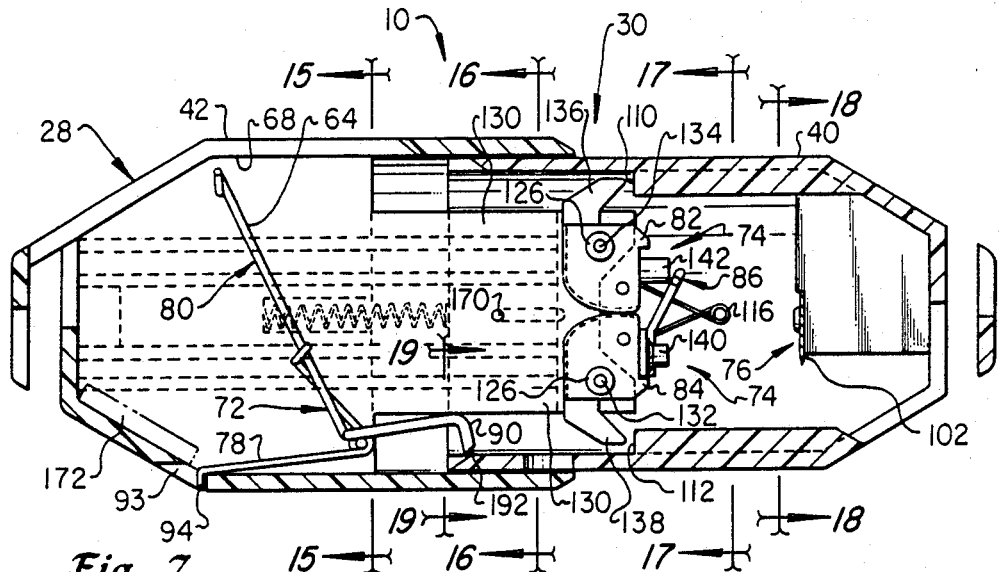
FIG. 7 is a longitudal cross-section taken along line 7—7 of FIG. 2.

Turning now to FIG. 7, a lngitudinal cross-section of the invention 10 taken along line 7—7 of FIG. 2 can be seen. This longitudinal cross-section illustrates a preferred embodiment of the invention 10 in an unarmed-/uncompressed condition. From this view a majority of the internal mechanisms of the invention 10 may be fully appreciated. An inspection of FIG. 7 reveals trigger assembly 72, cam assembly 74 and a line cutting assembly 76.

The trigger assembly 72, cam assembly 74 and line cutting assembly 76 work in concert with each other to effect the invention 10's intended purposes. This coordinated action can be better appreciated as each respective assembly is further described herein.

Figure 10:
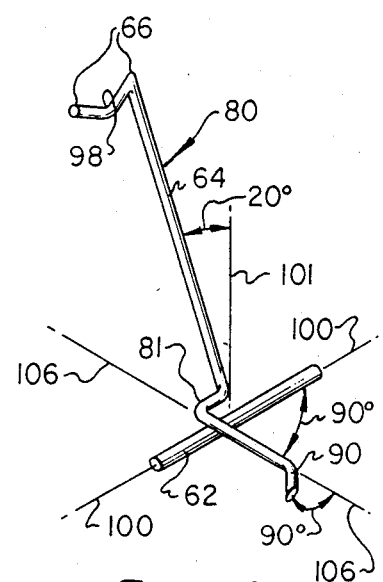
FIG. 10 is an enlarged perspective view of a trigger assembly utilized in a preferred embodiment of the invention.

Accordingly, the trigger assembly 72 further comprises a trigger spring 78 and a trigger lever 80. FIG. 10 illustrates an enlarged perspective view of the trigger lever 80. It may be appreciated from this figure that the trigger lever 80 comprises a V-groove 98 and a trigger foot portion 90. Also shown is a trigger pivot arm 62. The trigger lever 80 is preferably formed as sown in FIG. 10. More exactly, the shank portion 64 is formed approximately 20° degrees with respect to the axis 101.

The vertical length of shank portion 64 is selected so as to leave approximately 0.10 inch clearance between the top end 66 of the trigger lever 80 and the inside surface 68 (see FIG. 7) of upper casing 42. As previously mentioned, the shank portion 64, is further formed into a V-groove 98 at the top at the top end 66 of shank 64. The V-groove 98 functions to maintain a line 20 on the trigger lever 80, during loading of device 10 onto a line 20 and during device 10's operation.

The lower end portion 81 of the shank portion 64 is characterized by an inward and then an outward bend. This configuration facilitates the positioning of V-groove 98 just below line channel 32. The aforementioned inward bend is typically formed parallel to axis 100 (shown in pantom lines in FIG. 10) and then protrudes outwardly as shown along axis 106 (also shown in phantom in FIG. 10), perpendicular to or 90° degrees with respect to axis 100. The shank portion 64 takes one more, bend as shown in FIG. 10, downward and parallel to axis 101, and 90° degrees with respect to axis 106. This latter bend formation is referred to herein as the trigger foot portion 90.

A trigger pivot arm 62, as shown in FIG. 10 positioned along axis 100, is affixed to shank portion 64, perpendicular to axis 106 and to axis 101. Pivot arm 62 not only functions to pivotally maintain the trigger lever 80 in place with the upper casing 42 (see FIG. 7) but also serves to support a trigger spring 78 (Also, see FIG. 7).

Figure 15:
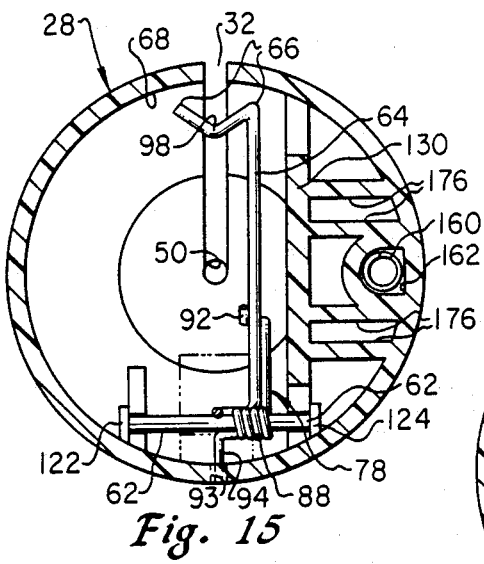
FIG. 15 is a cross-sectional view taken along line 15—15 of FIG. 7.

Reference is now made to FIG. 10 in conjunction with FIG. 15 so that a more complete appreciation of the construction and positioning of trigger assembly 72 within upper casing 42 may be had. FIG. 15 is a cross-sectional view taken along line 15—15 of FIG. 7, illustrating such positioning. V-groove 98 is clearly shown positioned just beneath the (opening) line channel 32 and inside surface 68 of upper casing 42. Trigger pivot arm 62 is shown inserted and held in place by body ribs 122 and 124. Body ribs 122 and 124 are preferably molded as an integral part of the upper casing 42. Such integral molding reduces the total number of parts, assembly time and increases strength and stability of body ribs 122 and 124.

Trigger spring 78 is shown in FIG. 15 coiled about pivot arm 62 at the point shown by reference number 88. Spring end portion 92 is shown engaged about shank portion 64. The casing grip portion 94 of trigger spring 78 is maintained in trigger spring retention slot 93 (retention slot 93 best shown in FIGS. 7-9). The trigger spring retention slot 93 is essentially a small cut out portion in the upper casing 42 which can also be visualized with reference to FIGS. 2d and 3d. It may be appreciated further from these later figures that the casing grip portion 94 fits flush with and does not protrude out from casing 42.

The aforementioned positioning of the casing grip portion 94 maintains trigger lever 80 in place within body ribs 122 and 124. The number of turns in trigger spring 78 at point 88 in conjunction with the gauge of the wire, comprising trigger spring 78 determines th force required to be applied by angler 12 to a snagged line in order to activate/trigger the device. Experience has shown that approximately five (5) lbs. of force is desirable. The mechanics of such activation/triggering will be described infra.

Figure 11:
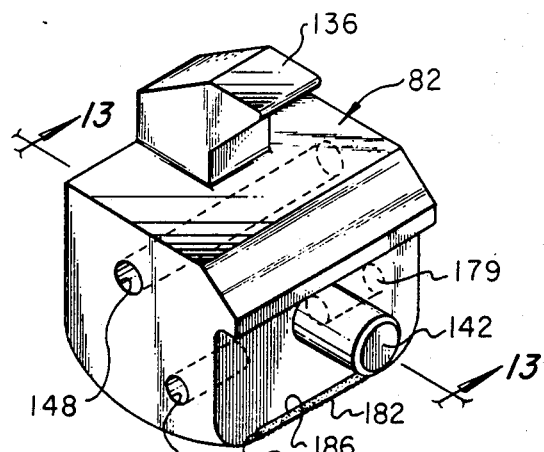
FIG. 11 is an enlarged prospective view of a cam utilized in a preferred embodiment of the invention.

Reference is now made to FIG. 7 and 11 for the appreciation of the cam assembly 74. FIG. 11 is an enlarged perspective view of left cam 82. The primary components of cam assembly 74 comprise a left cam 82, right cam 84, line guide arm 86 and cam spring 116. Each cam's construction is essentially a mirror image of the other.

Cam 82 and 84 are further characterized by cam arms 136 and 138 respectively. Briefly, these cam arms cooperate with cam positioning ribs 110 and 112 during arming of the device 10 to spread apart cams 82 and 84.

More specifically, as alluded to above it must be appreciated that the basic structure of cam 82 as illustrated in FIGS. 7 and 11 is identical to the structure of right cam 84. This symmetrical construction reduces costly tooling and simplifies assembly of the device 10. This is because the symmetrical cam design allows for the interchangeability of the cams during assembly. During assembly of device 10, however, only one of the cams, i.e., the right cam 84 is assembled with a line positioning arm 86. The assembly of the right cam 84 is accomplished by the placement and fixation of internal line guide 86 onto the right cam 84 via cam post 140.

Figure 8:
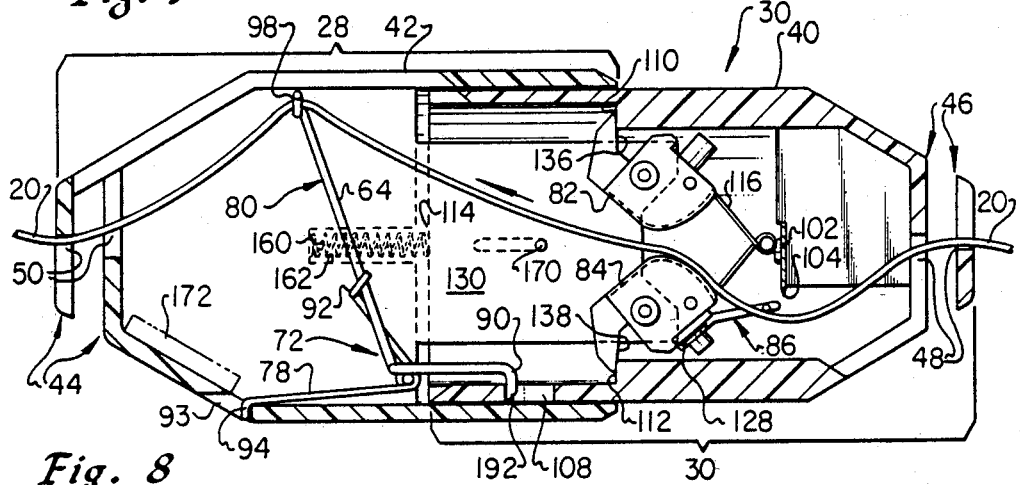
FIG. 8 is a longitudal cross-section taken along line 8—8 of FIG. 3.
Figure 12:
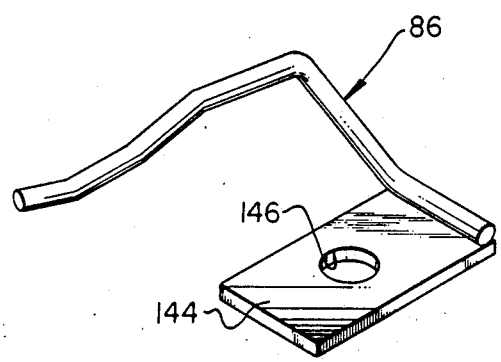
FIG. 12 is an enlarged perspective view of the internal line guide 86 utilized in a preferred embodiment of the invention.

Reference is now made to FIG. 12, in addition to FIGS. 11 and 7, to further clarify the preferred construction of line positioning arm 86. FIG. 12 is an enlarged perspective view of line positioning arm 86 utilized in a preferred embodiment of the invention 10. The line positioning arm 86 is preferably formed out of a stiff wire (bent as shown) in FIG. 12. Such wire is secured to plate 144 by means well known in the art. Hole 146 in mounting plate 144 is specificaly designed for the placement of line positioning arm 86 onto right cam 84 (see FIG. 7). The fixation of plate 144 to the right cam 84 is preferably accomplished via the use of a retention ring 128 (as best shown in FIG. 8), which fits around post 140, snugly against mounting plate 144. Cam post 142 of the left cam 82 remains unused.

Further inspection of cam 82, in FIG. 11, reveals cam pin fitting hole 148, which penetrates the width of cam 82. This penetration may be appreciated by the hidden lines in FIG. 11. Right cam 84 has a similar cam pin fitting hole (not shown). Left cam pin fitting hole 148 and its identical counter part in the right cam 84 allow for the placement of the cam assembly 74 on or about cam pins 132 and 134 respectively.

Figure 17:
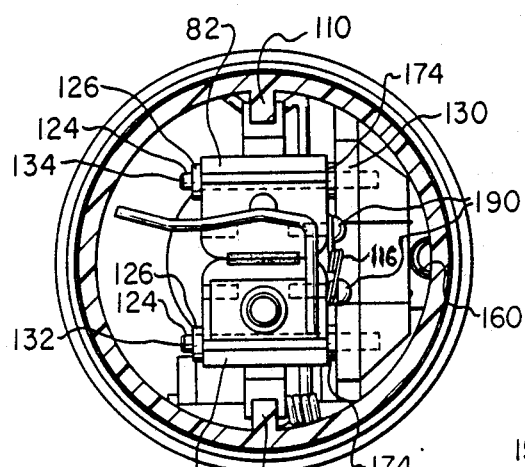
FIG. 17 is a cross-sectional view taken along line 17—17 of FIG. 7.

More particularly, cam pins 132 and 144 protrude from cam ledge 130 as shown in FIGS. 7 and 17. The cam pins 132 and 134 are preferably ultrasonically affixed to said cam ledge 130. However, gluing, screw attachment, or the like are acceptable alternative means of construction fully within the spirit and scope of this invention. It is also noted that cam pins 132 and 134 are long enough to provide for adequate insertion within cam ledge 130 while being long enough to protrude slightly above cams 82 and 84. The slight protrusions allow for the placement of retaining rings 126 on to cam pins 132 and 134, over installed cams 82 and 84, to loosely but affirmatively maintain cams 82 and 84 on cam pins 134 and 132 respectively. Cam washers 174, as shown in FIG. 17, can be used to reduce friction between cams 82 and 84 and cam ledge 130, thereby enhancing the cams freedom of movement. Support ribs 176 add strength and butress cam ledge 130 against the forces exerted thereupon by cams 82 and 84 during clamping and cutting.

Returning now, to FIG. 11 it can be seen that left cam 82 further comprises mounting holes 178 and 179. Similar mounting holes (not shown) are provided in the symetrically constructed right cam 84. The mounting holes do not completely penetrate the left cam 82 or the right cam 84 but rather penetrate each cam approximately one-quarter (¼) of the width of each respective cam. This may be visualized by reference to FIG. 11, wherein dotted lines illustrate the relative depth of penetration of mounting holes 178 and 179. Again the symmetrical construction of the cams facilitates the interchangeability of the cams during assembly and reduces the requirement for additional tooling.

Monting holes 178 or 179 are used for securing the cam spring 116 between the cams 82 and 84. This securement may be best appreciated by reference to FIG. 17. FIG. 17 is a cross-sectional view taken along line 17—17 of FIG. 7. Typically, a screw is used to secure the ends of cam spring 116 to each of the cams 82 and 84 respectively. The end portions of the spring 116 (end portions not shown) are preferably circularly looped in shape so that the head 190 of each fastening screws are of sufficient diameter so as to affirmatively clamp the circular end portions of the cam spring 116 to the cams.

Figure 18:
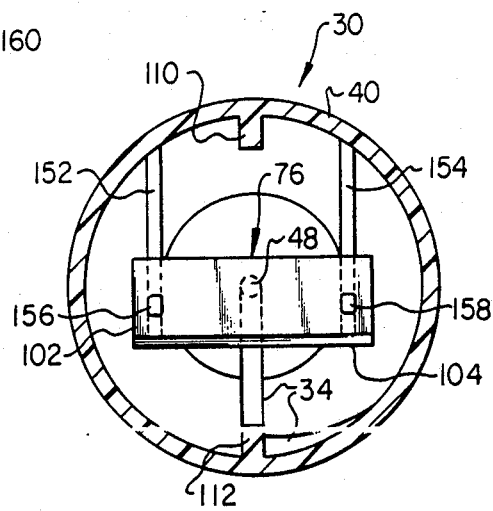
FIG. 18 is a cross-sectional view taken along line 18—18 of FIG. 7.

Reference is now made to FIGS. 7 and 18 for discussion of the line cutting assembly 76. FIG. 18 is a cross-sectional view taken along line 18—18 of FIG. 7 illustrating the line cutting assebbly 76. Line cutting assembly 76 comprises a blade 102 and support ribs 152 and 154. Blade 10 is preferably a single edged blade formed out of stainless steel to reduce rusting and concomitant dulling of blade cutting surface 104. Blade 102 has two mounting holes therein (not specifically shown) for the mounting of blade 102 onto protrusions 156 and 158 of support ribs 152 and 154 respectively. It is noted that support ribs 152 and 154 are preferably formed as an integral part of the lower casing 40 of the invention 10.

During assembly the mounting holes of blade 102 are aligned with protrusions 156 and 158. Blade 102 is then placed down over the protrusions 156 and 158 so that the cutting surface 104 is positioned toward line channel 34. Once blade 102 has been so placed, protrusions 156 and 158 are preferably heat welded to secure blade 102 firmly against ribs 152 and 154.

Figure 2E:
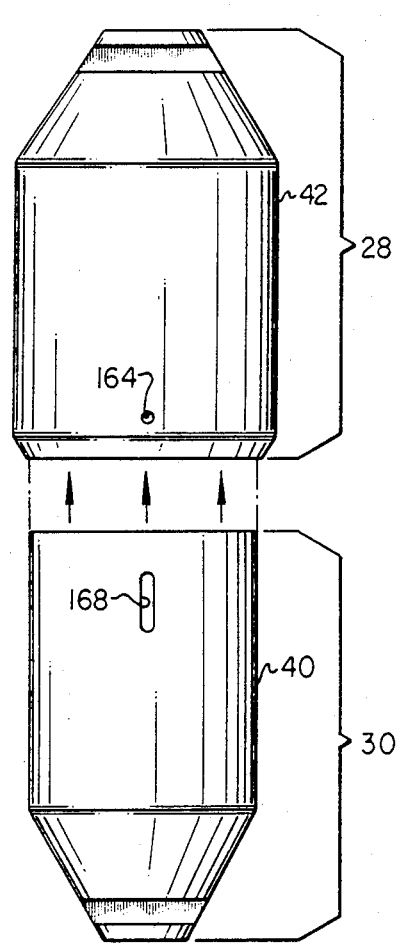
FIG. 2e is a rear elevational view of the invention illustrated in FIG. 2, but shown in a separated state.
Figure 20:
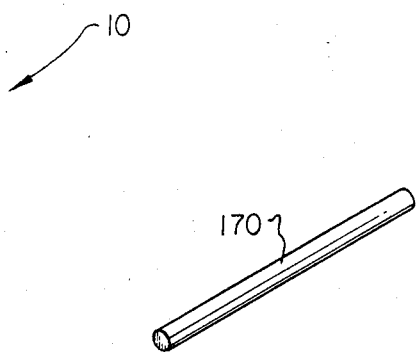
FIG. 20 is a perspective view of a roll pin use with a preferred embodiment of the invention.

Reference is now made to FIG. 2e to appreciate the joining of the upper and lower casings 42 and 40 respectively. FIG. 2e is a rear elevational view of the invention as illustrated in FIG. 2, but shown with upper assembly 28 separated from lower assembly 30. Once the trigger assembly 72, cam assembly 74 and line cutting assembly 76 are in place within their respective casings 40 and 42; then the upper and lower assembly 28 and 30 are joined together. The lower assembly 28 and 30 are joined by the lignment of lower casing 40 with upper casing 42 so that roll pin hole 164 in the upper casing 42 aligns with roll pin cutout 168 of the lower casing 40.

Once the aforementioned alignment is effected then the lower assembly 30 is inserted within the upper assembly 28. The inner diameter of casing 42 is large enough to accommodate the outer diameter of the casing 40. This configuration specifically facilitates the free sliding movement of assembly 30 within assembly 28.

Figure 16:
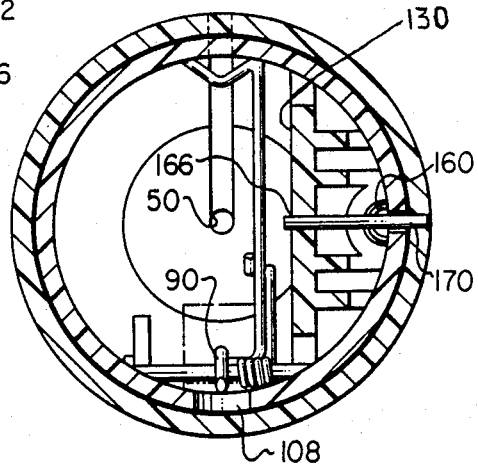
FIG. 16 is a cross-sectional view taken along line 16—16 of FIG. 7.

The lower assembly 30 is then held in place with respect to the upper assembly 28 via a roll pin 170 as shown in FIG. 20, and FIGS. 7-9. More particularly, the joining of the upper assembly 28 and the lower assembly 30 is accomplished by inserting roll pin 170 through hole 164, and through cutout 168. Roll pin 170 also extends through a roll pin hole 166 of ledge 130 (as best shown in FIG. 16) to complete the joining of the upper and lower assemblies 28 and 30 respectively. It is noted that the roll pin cutout 168 allows for the movement of lower assembly 30 within the confines of upper assembly 28 so that cam assembly 74, trigger assembly 72, and line cutting assembly 76 will properly operate as now described.

Reference is now made to FIGS. 3 and 8 in order to more fully appreciate the operation of invention 10. FIG. 8 illustrates a longitudinal cross-section taken along line 8—8 of FIG. 3. As previously mentioned, FIG. 3 is a perspective view of a preferred embodiment of the invention, illustrated in an armed/compressed position. The armed/compressed position is the configuration in which the invention 10 is placed onto a snagged line to be retrieved.

The acts of an angler compressing the lower casing 40 into the upper casing 42 brings the ribs 110 and 112 into contact with cam arms 136 and 138 respectively. Continued compression by the angler causes ribs 110 and 112 to further interact with cam arms 136 and 138 to open cams 82 and 84.

The angler's compression stores energy in cam spring 116 and compression spring 160. More exactly, the movement of lower casing 40 into upper casing 42, causes the leading edge 114 of lower casing 40 to compress spring 160 into spring cavity 162. Compression spring 160 maintains tension on trigger assembly 72 and exerts a decompressing force on the upper end lower casings 42 ad 40 respectively. Cam spring 116 exerts a spring force on cams 82 and 84 urging such cams to close.

Figure 19:
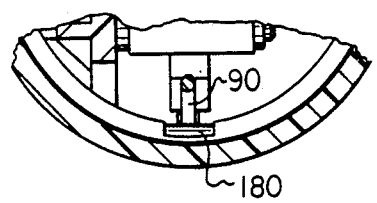
FIG. 19 is a partial cross-sectional view taken along line 19—19 of FIG. 7.

During compression, as lower casing 40 slides into upper casing 42, foot portion 90 of trigger lever 80 slides up a ramped surface 180 (see FIG. 19) and engages the lower casing via trigger stop 108. The slope of ramped surface 180 in conjunction with the bevelled portion 192 (see also FIG. 16) of foot 90 facilitate this sliding movement. Trigger stop 108 is preferably a circular hole which is positioned, as shown in FIG. 8, in lower casing 40. Trigger stop 108 does not protrude into the upper casing 42. The inner surface of upper casing 42 functions to add support to the trigger foot 90.

The combined fores stored in spring 160 and in the trigger spring 78 maintain device 10 in a compressed state for the use of device 10. This armed/compressed state is apparent in FIG. 8 by making reference to the visible compression of spring 160 and by the opened position of cams 82 and 84.

The armed device 10 is placed onto line 20 by manipulating device 10 so that line 20 enters the device through line guide 44 and through line channels 32 and 34, and so that the line 20 exits the device through line guide 46. Hence, device 10 is circularly manipulated about a line 20 to cause such line 20 to enter the device through line guide 44, line channels 32 and 34 and exit through line guide 46. This manipulation can be easily accomplished with one hand.

The positioning of channels 32 and 34, as briefly described, supra, may now be fully appreciated from inspection of FIGS. 3a-3d in conjunction with FIG. 8. The location of the line chances, as illustrated, faciltate the automatic positioning of line 20 within the device 10. A fishing line 20 is shown in FIG. 8, entering invention 10 through opening 50 in line guide 44. Line 20 passes over V-groove 98 of trigger lever 80 and between the opened cams 82 and 84. The line continues its path internal to the invention 10 over line positioning arm 86 and then exits the lower casing 40 via opening 48 of line guide 46.

Once device 10 is armed/compressed and loaded onto line 20, device 10 is released, thereby, allowing it to descend through water via the force of gravity to a point proximate the snag. Weight 172, typically 1.75 ounces or more of lead metal, is used within device 10 to facilitate the descent of the device. Weight 172 has been illustrated by way of example, in FIG. 8, as being located internal to the upper casing 42. The positioning, however, of weight 172 is not critical in so far as it does not interfere with the internal mechanisms of the device 10 or obstruct line channels 32 or 34. In some embodiments, the mass of the device 0 itself may alleviate the necessity or desirability of adding additional weight. As the device 10 descends trapped air escapes via line channels 32 and 34, line guides 44 and 46, and via trigger spring retention slot 93. As the trapped air escapes, invention 10 fills up with water and becomes non-buoyant which functions to further assist the invention 10's descent.

Figure 9:
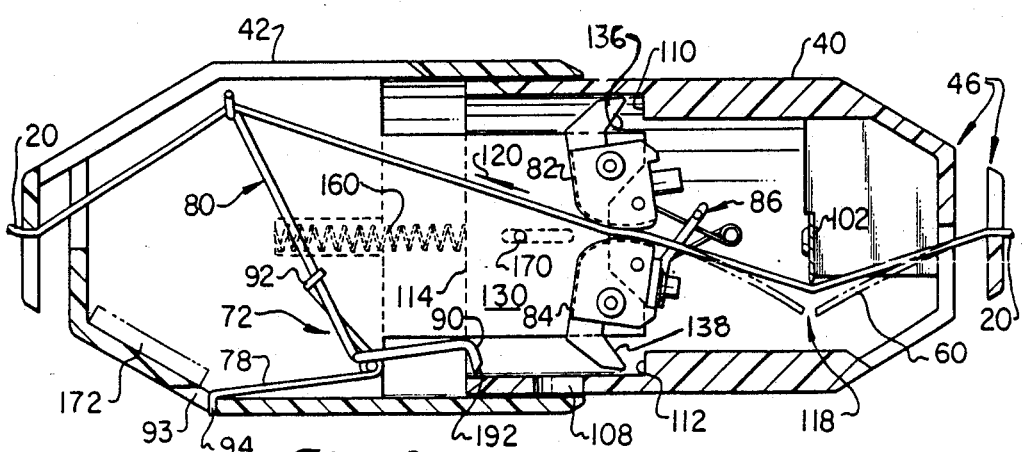
FIG. 9 is a transitional, longitudal, cross-sectional view of a preferred embodiment of the invention taken along line 8—8 of FIG. 3 illustrating the clamping and severing of a line.

Upon the completion of the invention 10's descent, a tug or slight pulling is applied to line 20 in order to activate/trigger the device 10. FIG. 9 is a transitional, longitudinal, cross-sectioaal view of a preferred embodiment of the invention illustrating the clamping and severing of a line 20. As can be seen in FIG. 9, tension via the anglers tug or pulling, eliminates the slack in line 20 and exerts pressure on the trigger assembly 72. Arrow 120 indicates the direction of pulling force on line 20. More particularly, as line 20 exerts force to trigger lever 80, trigger lever 80 transfers such force to spring 78. When the force on line 20 approximates or exceeds five (5) lbs., end portion 92 of trigger spring 78 collapses in the direction of the casing grip portion 94 of the trigger spring 78. This movement results the trigger lever 80's movement, thereby causing trigger foot 90 to retract form trigger stop 108.

This action has the effect of allowing compression spring 160 to expand against surface 114 of the lower casing 40, thereby forcing lower casing 40 out of its compressed position within the upper casing 42. It may also be appreciatedfrom FIG. 9, that once device 10 is so triggered, that the movement of the lower casing 40 out from upper casing 42, also removes the contact of body ribs 110 and 112 from cam arms 136 and 138 respectively. This movement allows the stored force in spring 116 to rapidly urge cams 82 and 84 to a closed position about line 20 as shown in FIG. 9.

Cams 82 and 84 not only clamp line 20 but also continue to tighten onto the line as a result of continued pulling on line 20 after device 10 has been triggered. The movement of the cams from an open to a closed position also moves the line positioning arm 86 to a point which no longer functions to positively maintain line 20 away from blade 102.

The contact of line 20 with blade 102 is clearly shown in FIG. 9. Continued pulling on line 20 by an angler functions to severe line 20 as shown at point 118 via phantom lines. More importantly, the positioning of blade 102 with respect to cams 82 and 84 and with respect to line guide 46 forces line 20 over the blade in a pyramidal fashion. The harder an angler pulls on line 20 the more the line is forced directly into the cutting surface 102.

Figure 13:
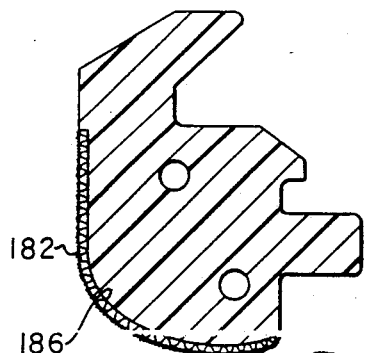
FIG. 13 is a sectional view taken along line 12—12 of FIG. 11, illustrating a coarse cam surface.
Figure 14:
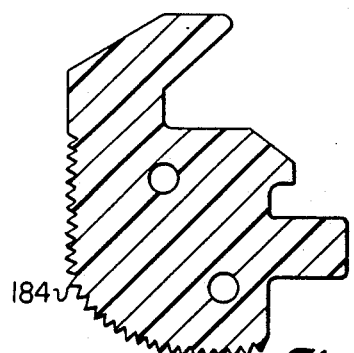
FIG. 14 is another sectional view similar to that taken along line 12—12 of FIG. 11 illustrating a grooved surface embodiment of the cam as illustrated in FIG. 11.

Once line 20 is severed, the device 10 is raised to the surface via the major portion of line 20, which is firmly affixed between cams 82 and 84. It is noted that at the moment line 20 is severed the cams tighten further due to inertia forces. The served, terminal portion 60 of line 20 exits device 10 via guide 46. Depending upon the nature and type of line to be retrieved, cams 82 and 84 may be varied. FIGS. 13 and 14 illustrate sectional views taken alone line 13—13 of FIG. 11 depicting a course/gritty surface 182 (FIG. 13) and a grooved/serrated surface 184 (FIG. 14) respectively. A course/gritty surface is often preferred for use with smooth mono-filament lines, especially such lines having a low test per square inch. A groove/serrated surface provides excellent gripping results with lines comprising materials such as cotton and/or DACRON. The embodiment of the cam illustrated in FIG. 13 and FIG. 11 further comprises a grip mounting surface 186 which is indented sightly for the application of an adhesive backed gripping surface. The indentation allows for the flush contact between the cams, after the gripping surface has been affixed to the cams.

Once the angler has retrieve the major portion of line 20 along with device 10, the angler removes device 10 from line 20. This removal is accomplished by compressing the device inwardly which as described previously causes cams 82 and 84 to open thereby allowing the retrieved line 20 to be removed from the invention 10. The invention 10 may then b conveniently stored for subsequent use.

Without departing from the spirit and scope of this invention, it is to be noted that the preferred embodiment of the invention 10 as illustrated in the drawings and as described herein, is only one particular embodiment of the invention 10 which may be utilized in conjunction with the teachings outlined herein. For example, other embodiments of the invention need not be hollow to necessarily enclose its mechanisms in order to function properly within the spirit and scope of the invention. Further, other embodiments can be so constructed by one of ordinary skill in the art to include propulsion apparatus such as gas propellants, compressed air, motorized engines and the like to propel the invention 10 in the direction of a snag regardless of the presence rr absence of gravitational forces.

The present disclosure includes that contained in the appended claims, as well as that of the foregoing description. Although this invention has been described in its preferred form with a certain degree of particularity, it is understood that the present disclosure of the preferred form ha been made only by way of example and that numerous changes in the details of construction and combination and arrangement of parts, in addition to numerous changes in the methods of use thereof, may be resorted to with out departing from the spirit and scope of the invention.

Now, that the invention has been described What is claimed is:

1. A fishing line retrieving apparatus comprising:
 a hollow body member having a specific gravity greater than one;
 a line cutting means for severing a line, said line cutting means being disposed internal to said body member;
 a line clamping means disposed within said body member, for affixing said line to said body member so as to prevent loss if said body member as a result of said severing;
 a triggering mans, disposed within said body member, for actuating said line clamping and said line cutting means, wherein said triggering means is actuated by the application of tension to said line; and a line guide means integrally formed as a part of said body member, for automatically disposing a line within said body member in a predetermined position with respect to said line clamping, line cutting and said triggering means, wherein said line guide means also slideably supports said body member on said line during said body member's movement down said line.

2. The fishing line retrieving apparatus as set forth in claim 1 wherein said hollow body member is streamlined.

3. The fishing line retrieving appartus as set forth in claim 2 wherein said hollow body member is bifrucated, having an upper and lower half, said lower half loosely fits within said upper half.

4. The fishing line retrieving appartus as set forth in claim 1 wherein said line guide means is integrally formed as part of said body member.

5. The fishing line retrieving appartus as set forth in claim 4 wherein said line guide means further comprises:
 a line channel; and
 a pair of guide members cooperating with said line channel.

6. The fishing line retrieving apparatus as set forth in claim 5 wherein said guide members comprise:
 a first pair of spacially separate but parallel positioned members having a first set of cutouts therein, said first set of cutouts oriented 180° degrees with respect to each other so that a spacial intersection of said first set of cutouts forms a first guide opening;
 a second pair of spacially separated members having a second set of cutouts therein, said second set of cutouts oriented 180° degrees with respect to each other so that a spacial intersection of said second set of cutouts forms a second guide opening; and
 said first pair of members are positioned along a longitudinal axis of said body member at one end of said body member and said second pair of members are positioned along said longitudinal axis of said body member at an opposite end of said body member, wherein said first set of cutouts are reverse oriented 180° degrees with respect to said second set of cutouts.

7. The fishing line retrieving apparatus as set forth in claim 5, wherein said line channel comprises an opening disposed along a length of said body member, and between said guide members, said line channel being positioned so as to allow said line to be loaded internal to said body member in a predetermined position with respect to said line clamping means, said triggering means and said line cutting means.

8. The fishing line retrieving apparatus as set forth in claim 5, wherein said line channel comprises an opening disposed along a length of said body member, and between said guide members, said line channel being positioned so as to prevent said line from being loaded internal to said body member when said triggering means has not been armed.

9. The fishing line retrieving apparatus as set forth in claim 1 wherein said line clamping means comprises a cam assembly, said cam assembly including two (2) cams and a cam spring interconnected between said cams.

10. The fishing line retrieving apparatus as set forth in claim 9 wherein one of said cams further comprises a line positioning arm, said line positioning arm functioning to maintain said line out of alignment with said line cutting means before said triggering means is actuated.

11. The fishing line retrieving apparatus as set forth in claim 9 wherein said cams have gripping surfaces positioned proximate to each other so that said cams may interact with each other, in conjunction with a force of said cam spring and force of said line in order to clamp a line there between, when said triggering means is actuated.

12. The fishing line retrieving apparatusas set forth in claim 11 wherein said gripping surfaces are grooved in texture.

13. The fishing line retrieving aparatus as set forth in claim 11 wherein said gripping surfaces are coarse grained in texture.

14. The fishing line retrieving apparatus as set forth in claim 1 wherein said line cutting means comprises a blade having at least one (1) cutting edge, said blade being attached to support ribs, said support ribs being internal to siid body member.

15. The fishing line retrieving apparatus as set forth in claim 3 wherein said triggering means comprises:
 a trigger lever; and
 a trigger spring engaged with said trigger lever and with said body member, wherein said trigger spring biases said trigger lever against said line.

16. The fishing lin retrieving apparatus as set forth in laim 15, wherein said trigger lever further comprises:
 a V-grooved upper portion functioning to position and loosely maintain said line on said trigger lever; and
 a shank portinn functioning to pivotally position said trigger lever within said body member so that when force is exerted on said line, said trigger lever pivots as said force is applied to said line against said trigger spring.

17. The fishing line retrieving apparatus as set forth in claim 16, wherein said trigger lever further comprises a lower foot portion which functions to engage said lower half of said body member, thereby mainting said lower half of said body member in a compressed position within said upper half of said body member against force stored in a compression spring, until said trigger lever pivots.

18. A line retrieving apparatus comprising:
 a body member;
 a line guide means, attached to said body member, for slideably supporting said body member on a line during said body member's movement down said line;
 a line cutting means, attached to said body member, for severing said line;
 a line clamping means, attached to said body member, for affixing said line to said body member during said severing and during retrieval of said line along with said body member; and
 a triggering means, attached to said body member, for actuating said line clamping and said line cutting means, wherein said triggering means is actuated by the application of tension to said line.

19. The line retrieving apparatus as set forth in claim 18, wherein said body member is hollow, streamlined and bifrucated, said body member further comprising an upper and lower half, said lower half so constructed to loosely fit within said upper half.

20. The line retrieving apparatus as set forth in claim 18 wherein said body member has a specific gravity greater than one (1).

21. The line retrieving apparatus as set forth in claim 19, wherein said line guide means further comprises:
   a pair of guide members, one of said guide members being integrally formed as part of said upper half of said body member and one of said guide members being integrally formed as part of said lower half of said body member; and
   a line channel, integral to said body member's upper and said lower halves, said line channel cooperating with said guide members to dispose a line within said body member.

22. The fishing line retrieving apparatus as set forth in claim 21, wherein said guide members comprise:
   a first pair of spacially separate but parallel positioned members each member having a first cutout therein, and wherein each of said members are oriented approximately 180° degrees with respect to each other so that a special intersection of said first cutouts form a first guide opening;
   a second pair of spacially separated members each respective member having a second cutout therein, said second pair of spaciously separated members being oriented 180° degrees with respect to each other so that a spacial intersection of said second cutouts form a second guide opening; and
   said first pair of spacially separated members are positioned along a longitudinal axis of said body member at one end of said body member and said second pair of spacially separated members are positioned along said longitudinal axis of said body member, wherein said first cutouts are reverse oriented approximately 180° degrees with respect to said second cutouts.

23. The line retrieving apparaus as set forth in claim 21, wherein said line channel is positioned so as to create a path for said line between said guide members when said lower half is compressed within said upper half.

24. The line retrieving apparatus as set forth in claim 18 wherein said line cutting means comprises a blade having at least one (1) cutting edge, said blade being affixed and positioned internal to said body member.

25. The line retrieving apparatus of claim 18, wherein said line clamping meass comprises two (2) cams and a cam spring interconnected between said cams.

26. The line retrieving appratus as set forth in claim 23 wherein one of said cams further comprises a line positioning arm; said line positioning arm functioning to maintain said line out of alignment above said line cutting means until said triggering means is actuated.

27. The line retrieving appartus as set forth in claim 25 wherein said cams each respectively have gripping surfaces positioned proximate to each other so that said cams may interact with each other, as a result of a force store in said cam spring inconjunction with a force applied to said line, in order to clamp said line there between.

28. The line retrieving apparatus as set forth in claim 18, wherein said triggering means means comprises:
   a trigger lever; and
   a trigger spring engaged with said trigger lever and with said body member, wherein said trigger spring biases said trigger lever against said line.

29. The line retrieving apparatus as set forth in claim 28, wherein said trigger lever further comprises:
   a V-grooved upper portion functioning to position and loosely maintain said line on said trigger lever; and
   a shank portion functioning to pivotally position said trigger lever within said body member so that when force is exerted on said line, said trigger lever pivots as said force is applied to said line against said trigger spring, said pivoting causing said actuation of said line clamping and said line cutting means.

30. An apparatus comprising in combination:
   a retrieving means for travelling down a snagged line to a point of ensnarement of said line, said retrieving means further functioning to grip and sever said line; and
   a triggering means for actuating said retrieving means, wherein said triggering means is actuated via an application of tension on said snagged line, thereby eliminating the need for separate control lines, dissolving tablets and the like.

31. A line retrieving apparatus comprising:
   a hollow streamlined, bifrucated body member;
   a line guide means for disposing a line within said body member, said line guide means further functioning to loosely support said body member on said line;
   a line cutting means for severing said line, said line cutting means being disposed within said body member;
   a line gripping means, disposed within said body member, for affixing said line to aid body member during said severing;
   a triggering means, disposed within said body member, for actuating said line clamping and said line cutting means, said triggering means being actuated via application of tension to said line, thereby eliminating the need for separate control lines, dissolving tablets and the like.

32. An apparatus comprising:
   a releasing means for severing a line; and
   a triggering means for actuating said releasing means, wherein said triggering means is activated via application of tension to said line, thereby eliminating the need for separate control lines, dissolving tablets and the like.

33. A method for retrieving the major portion of a line along with a retrieving apparatus without the requirement for a separate control line, dissolving tablets and the like, comprising the steps of:
   placing said retrieving apparatus onto a line;
   allowing said retrieving aparatus to travel to a desired point along said line; and
   applying a force to said line in order to activate said retrieving apparatus, wherein said line is gripped and cut.

34. The method as set forth in claim 33, wherein said placement step further comprises:
   arming said retrieving apparatus; and
   loading said line into an operating position with respect to line gripping, line cutting and triggering means of said retrieving apparatus.

35. The method as set forth in claim 33, wherein said tavel step comprises the physical release of said retrieving apparatus, wherein said retrieving apparatus descends via gravity along said line.

36. The method as set forth in claim 33, wherein said application of force to said line comprises the tugging and/or pulling on said line.

37. The method as set forth in claim 33, wherein said travel step comprises the physical release of said retrieving apparatus and application of direciionally applied force to said retrieving device in the absence of gravity whrrein said retrieving device travels along said line in the direction of said aplied force.

38. The method as set forth in claim 33, wherein said travel step comprises the release of said retrieving device and the application of directionally applied force to said retrieving device, wherein said eetrieving device travels along said line in the direction of said applied force.

* * * * *